(12) United States Patent
Hendrix et al.

(10) Patent No.: US 10,813,423 B2
(45) Date of Patent: Oct. 27, 2020

(54) NON-VIEW OBSTRUCTING UMBRELLA

(71) Applicants: Marilyn Teresa Hendrix, Seal Rock, OR (US); Barry Blaine Hendrix, Seal Rock, OR (US)

(72) Inventors: Marilyn Teresa Hendrix, Seal Rock, OR (US); Barry Blaine Hendrix, Seal Rock, OR (US)

( * ) Notice: Subject to any disclaimer, the term of this patent is extended or adjusted under 35 U.S.C. 154(b) by 188 days.

(21) Appl. No.: 15/397,568

(22) Filed: Jan. 3, 2017

(65) Prior Publication Data

US 2018/0184770 A1    Jul. 5, 2018

(51) Int. Cl.
   *A45B 19/10* (2006.01)
   *F16C 11/00* (2006.01)
   *A45B 17/00* (2006.01)

(52) U.S. Cl.
   CPC .............. *A45B 19/10* (2013.01); *F16C 11/00* (2013.01); *A45B 17/00* (2013.01); *Y10T 16/544* (2015.01); *Y10T 16/5445* (2015.01); *Y10T 403/32557* (2015.01); *Y10T 403/32581* (2015.01); *Y10T 403/32591* (2015.01)

(58) Field of Classification Search
   CPC ....... A45B 19/10; A45B 19/06; Y10T 16/544; Y10T 16/5443; Y10T 403/32549; Y10T 403/32557; Y10T 403/32581; Y10T 403/32591; F16C 11/045; F16C 11/00
   USPC .................... 135/20.1, 25.1, 26, 31
   See application file for complete search history.

(56) References Cited

U.S. PATENT DOCUMENTS

| | | | | |
|---|---|---|---|---|
| 1,059,504 A | * | 4/1913 | Teppert | F16C 11/045 403/116 |
| 1,642,336 A | * | 9/1927 | Friedrichs | A45B 19/10 135/22 |
| 1,728,062 A | * | 9/1929 | Ito | A45B 19/10 135/25.32 |
| 1,843,961 A | * | 2/1932 | Stone | A45B 19/10 135/25.32 |
| 3,328,077 A | * | 6/1967 | Krasinski | B60N 2/3013 297/378.12 |
| 5,505,221 A | * | 4/1996 | Gao | A45B 11/00 135/20.1 |
| D373,467 S | | 9/1996 | Chipman | |
| D390,696 S | | 2/1998 | Bauman | |
| 5,884,645 A | * | 3/1999 | Chen | A45B 19/04 135/25.1 |
| D419,759 S | | 2/2000 | Goudarzi | |
| D503,036 S | | 3/2005 | Di Cesare | |

(Continued)

FOREIGN PATENT DOCUMENTS

EP         2614746 A1 *  7/2013  ............. A45B 11/00
JP      2005177399 A  *  7/2005

*Primary Examiner* — David R Dunn
*Assistant Examiner* — Danielle Jackson
(74) *Attorney, Agent, or Firm* — Schwabe, Williamson & Wyatt, P.C.

(57) ABSTRACT

An adjustable non-view obscuring umbrella having a canopy and a support structure. The support structure having a support post, a plurality of non-articulating umbrella ribs, and at least one articulating umbrella rib. An articulating umbrella rib having an upper rib member, a lower rib member, and an umbrella rib articulation mechanism. An umbrella rib articulation mechanism having an upper bracket and a rotation actuation member, wherein the rotation actuation member is rotationally coupled to the upper bracket.

15 Claims, 10 Drawing Sheets

(56) References Cited

U.S. PATENT DOCUMENTS

| | | |
|---|---|---|
| D509,954 S | 9/2005 | Waltz |
| D546,551 S | 7/2007 | de Oliveira Santos |
| 7,246,629 B2 * | 7/2007 | You ................ A45B 19/04 135/29 |
| 7,350,530 B2 * | 4/2008 | Lisciandro ........ A45B 11/00 135/20.1 |
| 7,814,920 B2 * | 10/2010 | Lenahan ........... A45B 11/00 135/20.1 |
| D627,553 S | 11/2010 | Elder |
| D627,554 S | 11/2010 | Elder |
| D627,555 S | 11/2010 | Elder |
| D627,961 S | 11/2010 | Elder |
| D637,389 S | 5/2011 | Beaulieu |
| D664,760 S | 8/2012 | Elder |
| D664,761 S | 8/2012 | Horowitz |
| D668,444 S | 10/2012 | Jang |
| D669,677 S | 10/2012 | Cohen |
| D696,510 S | 12/2013 | Su |
| D707,037 S | 6/2014 | Tetsuro |
| D720,524 S | 1/2015 | Tetsuro |
| D731,165 S | 6/2015 | Principi |
| D736,515 S | 8/2015 | Chaklos |
| D737,565 S | 9/2015 | Di Cesare |
| D741,590 S | 10/2015 | Varga et al. |
| 9,629,428 B1 * | 4/2017 | Nei ................... A45B 25/02 |
| 2009/0308419 A1 * | 12/2009 | You .................. A45B 11/00 135/20.1 |
| 2010/0258151 A1 | 10/2010 | Vogt |
| 2018/0035770 A1 * | 2/2018 | LaBella ............ A45B 23/00 |

* cited by examiner

FIG. 1A
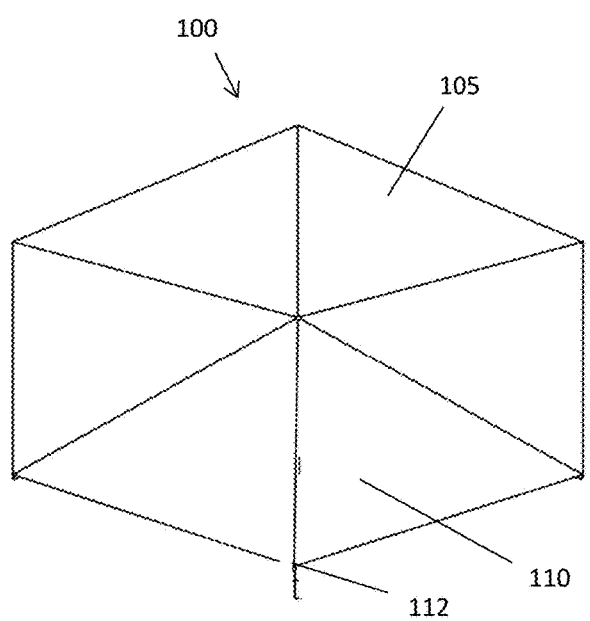
FIG. 1C
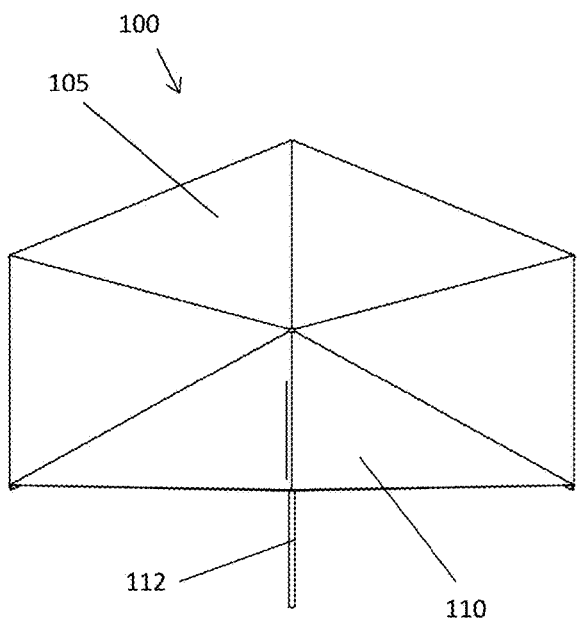
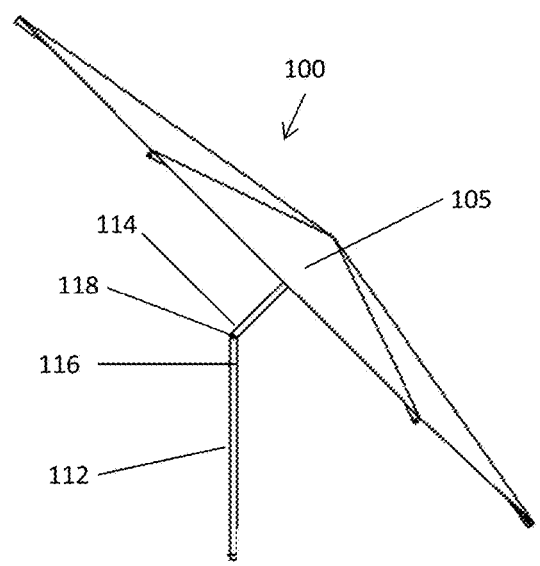
FIG. 1B
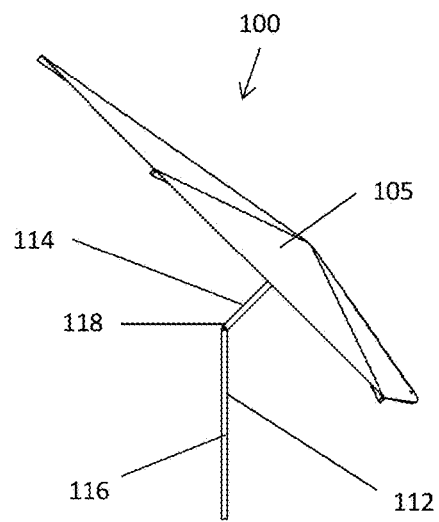
FIG. 1D

FIG. 3A
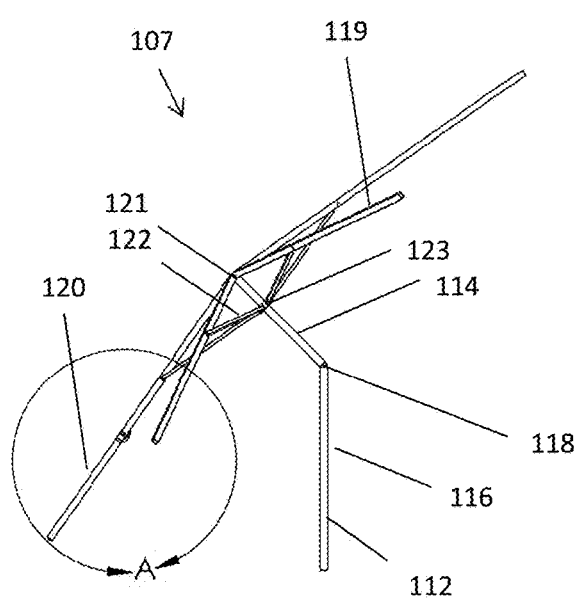
FIG. 3B
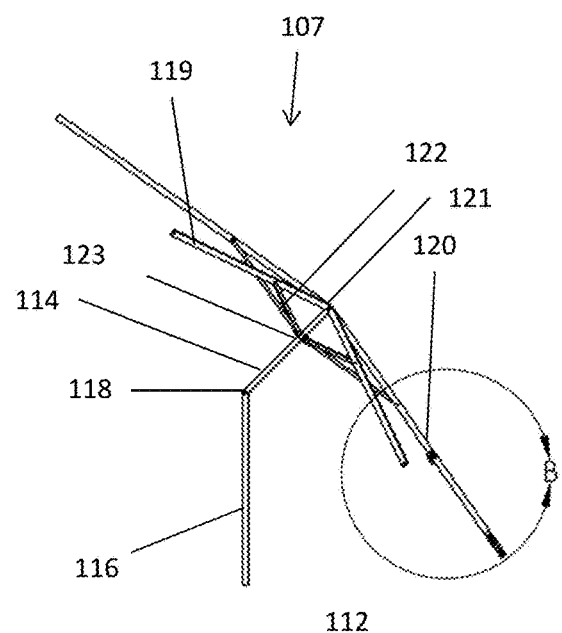
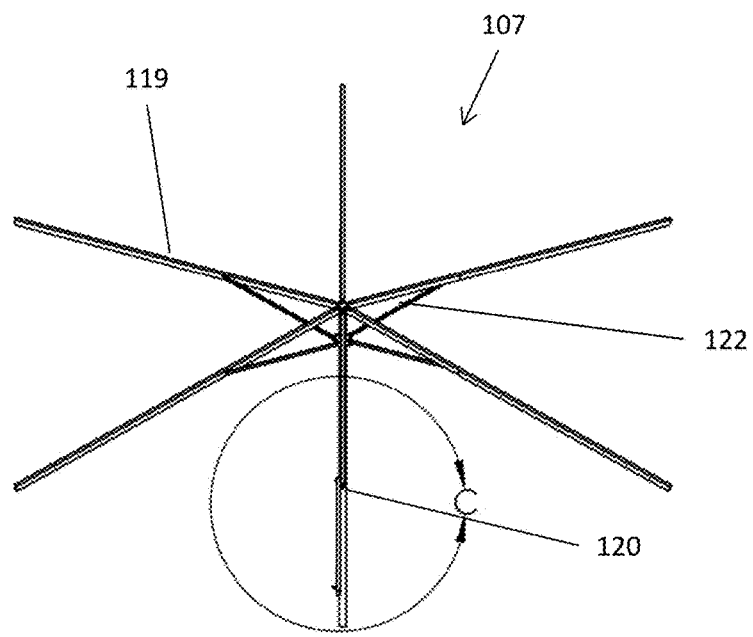
FIG. 3C

FIG. 6A
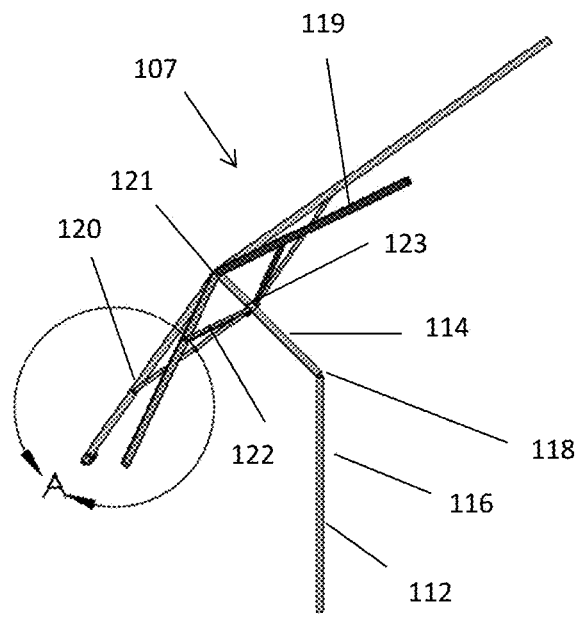
FIG. 6B
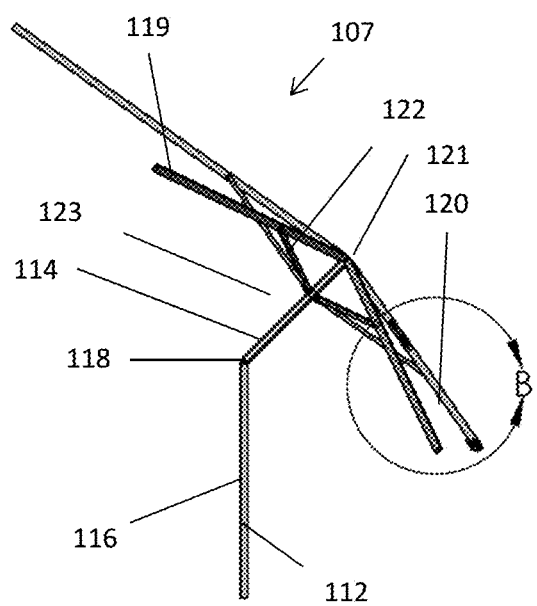
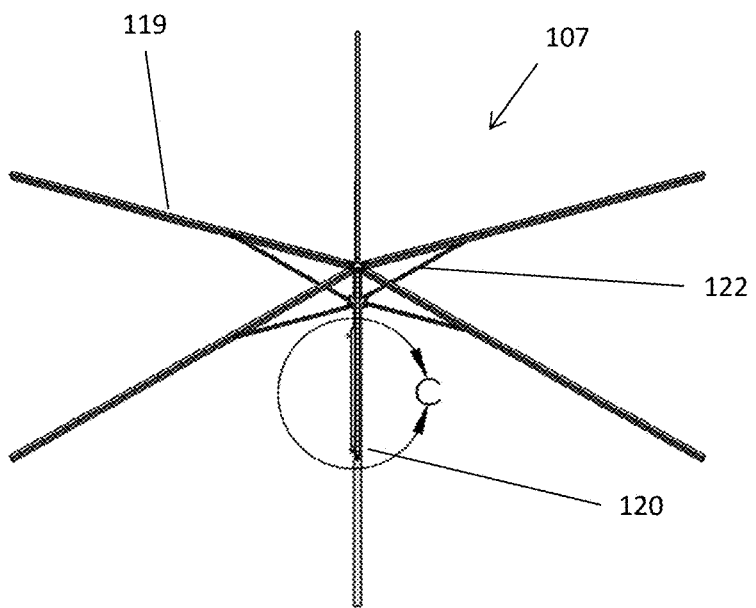
FIG. 6C

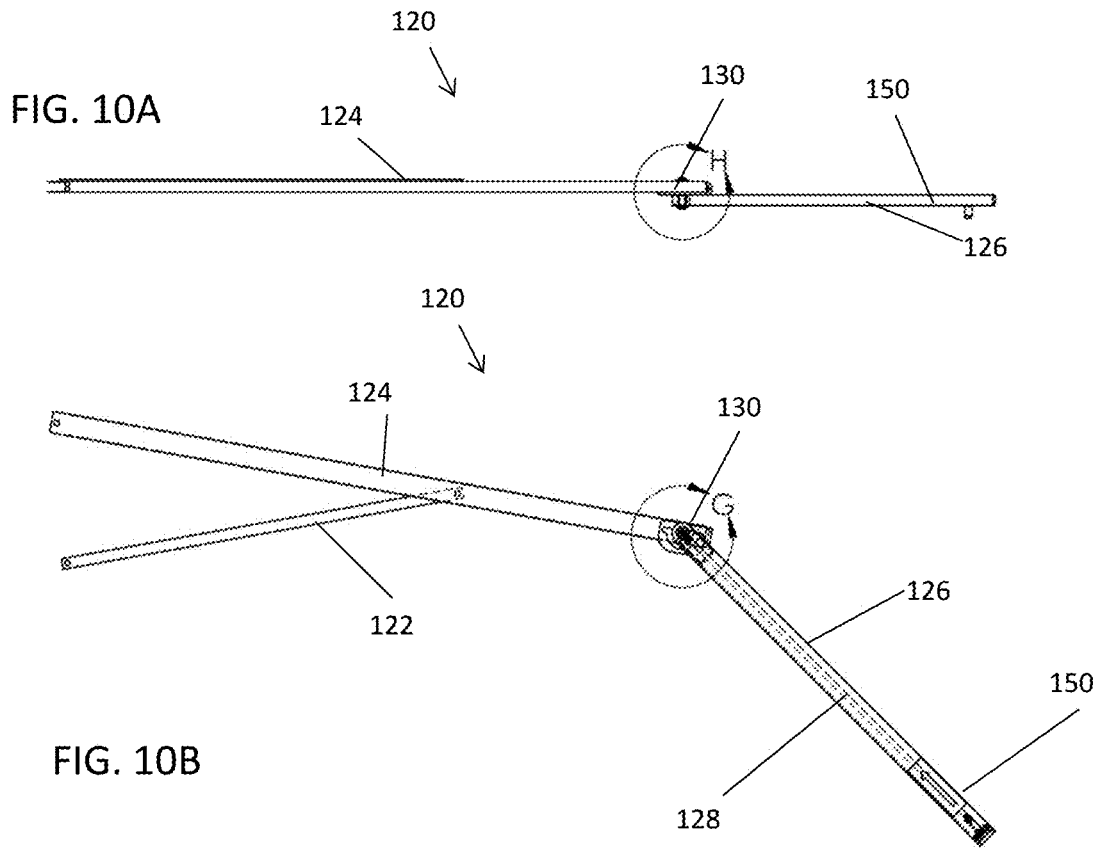
FIG. 10A
FIG. 10B
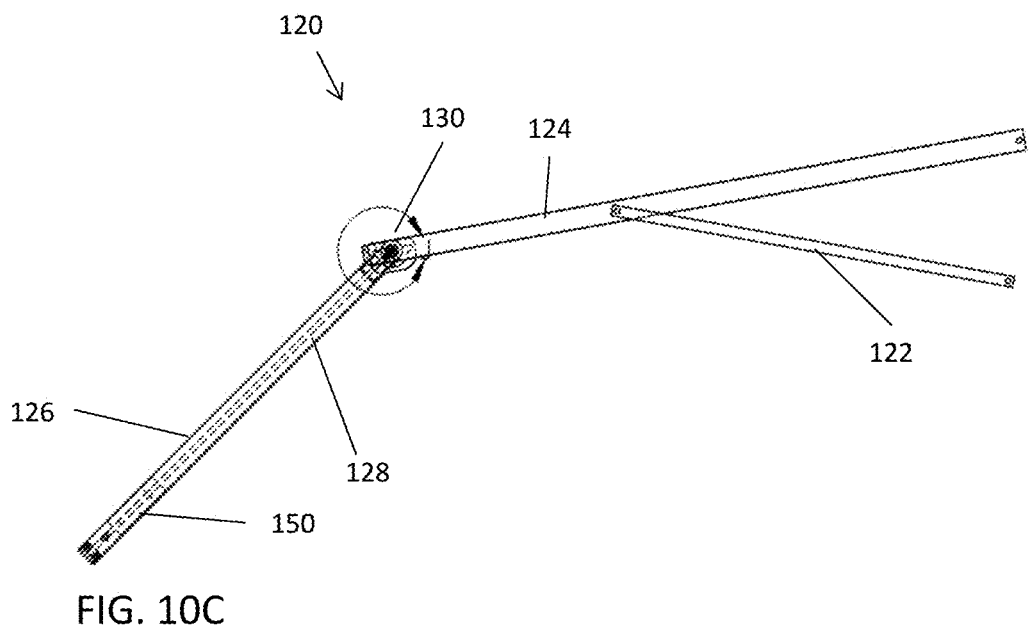
FIG. 10C

NON-VIEW OBSTRUCTING UMBRELLA

CROSS-REFERENCE TO RELATED APPLICATIONS

This application is related to U.S. Design Application No. 29/552,663, filed Jan. 25, 2016, which is specifically incorporated herein by reference in its entirety.

TECHNICAL FIELD

Embodiments herein relate to the field of umbrellas, and, more specifically to an umbrella and mechanism that helps to prevent the umbrella from obscuring the view of a user.

BACKGROUND

An umbrella or a parasol is a folding canopy typically supported by wooden, plastic or metal ribs, which is usually mounted on a wooden, metal, or plastic pole. These devices are designed to protect a person or items against rain and/or sunlight. The word "umbrella" typically refers to a device used for protection from rain; while parasol usually refers to device used to protect from the sun. Often the difference is the material used for the canopy; some parasols are not waterproof. Umbrella canopies may be made of fabric, flexible plastic, or other materials. Umbrellas and parasols can be hand-held portable devices sized for personal use. Larger parasols capable of blocking the sun for several people are often used as fixed or semi-fixed devices, used with patio tables or other outdoor furniture, or as points of shade on a sunny beach. Parasols are sometimes called sunshades.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIGS. 1A-1B are front view and side view illustrations of an umbrella that can be folded so as not to obscure the view of a user, in accordance with embodiments herein. In the illustrations the foldable portion is shown folded down.

FIGS. 1C-1D are front view and side view illustrations of an umbrella that can be folded so as not to obscure the view of a user, in accordance with embodiments herein. In the illustrations the foldable portion is shown folded up.

FIGS. 3A-3C are illustrations of a support structure of an umbrella that can be folded so as not to obscure the view of a user, with an articulating rib in the extended position, in accordance with embodiments herein.

FIGS. 6A-6C are illustrations of the support structure of an umbrella that can be folded so as not to obscure the view of a user, with an articulating rib in the folded position, in accordance with embodiments herein.

FIGS. 10A-10C are side view illustrations and a front view illustration of an articulating rib showing the folding of the rib, in accordance with embodiments herein.

DETAILED DESCRIPTION OF DISCLOSED EMBODIMENTS

Figure 2A:
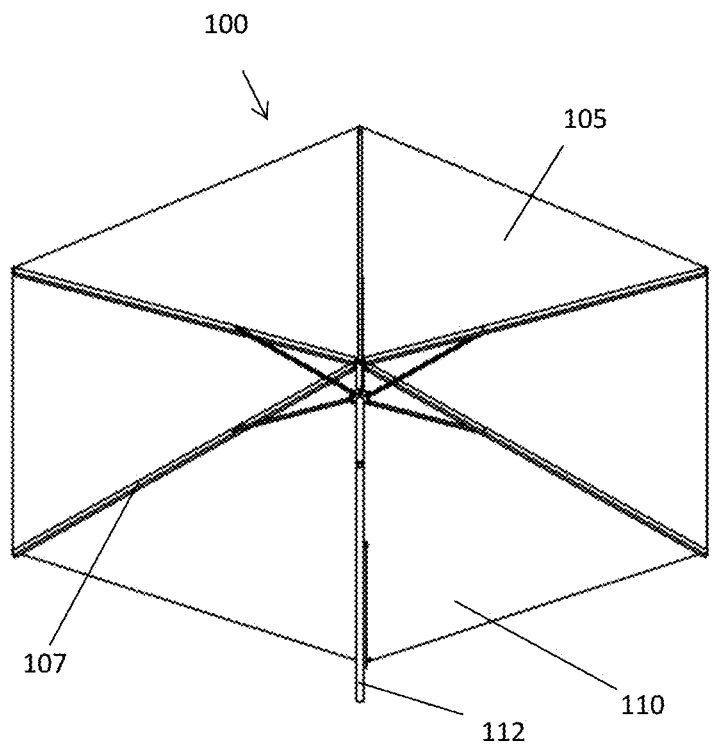
FIG. 2A is a back view illustration of an umbrella that can be folded so as not to obscure the view of a user, in accordance with embodiments herein. In the illustrations the foldable portion is shown folded down.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

The term umbrella is used throughout; however, as used herein umbrella is interchangeable with parasol. For example every instance of the word umbrella could be changed to parasol without departing from the scope of the disclosure.

One of the issues that face the users of umbrellas, and in particular stationary umbrellas, is that when the umbrella is tilted, for example to block the sunlight, the user's view may be unduly obscured by the bottom portion of the umbrella canopy. This problem is exacerbated the more the umbrella is tilted, and, in some cases, causes the user to abandon the use of the umbrella all together.

To overcome afore mentioned problems, the inventors have developed a unique solution. This unique solution is an articulating umbrella where the bottom portion of the canopy can be folded back and under the remainder of the canopy and secured in this position. This ability to fold a portion of the canopy is accomplished using one or more articulating ribs of the umbrella that are able to fold. This folded under portion allows the user to more easily see under the bottom portion of the umbrella even when the canopy of the umbrella uses severe tilt angle to block out sunlight. In addition, one of the unique features of the folding rib is that it allows the canopy of the umbrella to remain taut in both the folded and extended position, such that the canopy maintains its shape.

In addition to the convenience features with respect to blocking the sun and maintain the view, the articulating rib(s) can be positioned toward a wall or other encumbrance. For example collapsing of a single rib would allow much closer positioning to wall relative to center support. In this way, the canopy portion of the umbrella can be placed in locations that a traditional umbrella would not fit. Furthermore, one can envision having an umbrella with two or more articulating ribs, for example on opposing sides, so that the umbrella could be placed in narrow environments, such as a narrow sidewalk. In addition, by including a plurality of articulating ribs, such as 2, 3, 4, 5, or more, allows not only installations into narrow venues but in constrained 3-sided or even 4-sided positions where a decrease in overall footprint is desired. One of the advantages of the disclosed umbrella for the consumer, such as a restaurant owner, would be greater density of tables and more flexibility.

Disclosed herein in various embodiments is an adjustable non-view obscuring umbrella. The adjustable non-view obscuring umbrella includes a canopy and a support structure, for example, a support structure that supports the canopy. In embodiments, the support structure includes a support post, a plurality of non-articulating umbrella ribs, and at least one articulating umbrella rib. The inclusion of an articulating umbrella rib allows the portion of the canopy supported by this rib to fold inward (although one could imagine outward) removing this portion of the canopy from obscuring the view of the user (see, for example FIGS. 1A-2B). In embodiments, the articulating umbrella rib includes an upper rib member, for example pivotally attached to the cap of the umbrella, and a lower rib member that can be attached or otherwise coupled the edge of the canopy (the edge of course can have additional material hanging off it). Typically, an articulating rib would articulate in a linear fashion such that the lower rib member folds toward the upper portion (see, for example FIGS. 6A-8C). In embodiments, the articulating umbrella rib includes a joint that couples the upper rib member to the lower rib member. Typically this joint will have an articulation of about 180°, for example, so that in the stowed or folded position it is out of the way, and that in the open position it is fully extended. It is contemplated however that other degrees of articulation can be used depending on the application.

In embodiments, the joint of the articulating umbrella rib includes an umbrella rib articulation mechanism that, in some examples, includes a rotational coupling between the upper rib member and the lower rib member. In embodiments, the rib articulation mechanism includes folded position and extended position stops that work to hold or lock the rib in the folded or extended position, respectively. In embodiments, the articulation mechanism can be actuated by hand such that the articulating umbrella rib can be released from either the folded position or the extended position and maneuvered to the other position, e.g. from folded to extend and visa versa. In embodiments, the rib articulation mechanism includes an upper bracket, coupled to the upper rib member, and a rotation actuation member, coupled to the lower rib member. In embodiments, the rotation actuation member is rotationally coupled to the upper bracket, for example with a fastener, such as a brad, bolt, screw, rivet, and the like. It is also contemplated the orientation of the rotation actuation member and upper bracket could be reversed, for example the rotation actuation member could be coupled to the upper rib member and the upper bracket could be coupled to the lower rib member. In embodiments, the upper bracket includes a substantially semi-circular channel that a pin, such as a pin coupled to the rotation actuation member, can ride in. In this way, the relative rotational motion of the upper rib member and the lower rib member can be controlled. In some embodiments, there is no such channel and the fastener can be used to control the motion. In embodiments, the upper bracket includes a folded position stop and/or an extended position stop. In certain embodiments, the folded position stop and the extended position stop are channels in contiguous with the semicircular channel, for example radiating from or into the center of the semicircle. In embodiments, the umbrella rib articulation mechanism includes a tensioning element, for example to hold the articulation mechanism in the folded or extended configuration. In some examples a tensioning element is a compression tensioning element. In some examples a tensioning element is an extension tensioning element. In examples, the tensioning element is a spring, such as a compression spring. In embodiments, the tensioning element is coupled to the rotational actuation member. In embodiments, rotational actuation member is coupled to a hand activated trigger that can move the rotational actuation member, for example with a handle and/or rod coupled the rotational actuation member. In embodiments, the rotation actuation member is rotationally coupled to the upper bracket with a fastener. In embodiments, the support post is articulating. In embodiments, the support structure further comprises one or more of a plurality of stretchers, a cap, and a runner. The design of the folding rib portion of the umbrella is very convenient and easy to use. Incorporation of the hand activated slider or trigger combined with spring actuation and the guide channel creates a smoothly folding function that can be articulated with minimum effort. For example, the folding rib is designed for one-handed operation.

Also disclosed is an articulating umbrella rib. In embodiments, an articulating umbrella rib includes an upper rib member, a lower rib member, and an umbrella rib articulation mechanism. In embodiments, the rib articulation mechanism includes an upper bracket coupled to the upper rib member and a rotation actuation member, wherein the rotation actuation member is rotationally coupled to the upper bracket, for example with a fastener, such as a brad, bolt, screw, rivet, and the like. It is also contemplated the orientation of the rotation actuation member and upper bracket could be reversed. In embodiments an upper bracket includes a semi-circular channel, for example to allow a pin, such as locator pin to ride and/or travel. In embodiments the rotation actuation member includes a locator that rides within the semi-circular channel of the upper bracket when assembled. In embodiments, the upper bracket includes a folded and/or an extended position stop, which in some examples are channels contiguous with the semicircular channel. In embodiments, the umbrella rib articulation mechanism includes a tensioning element, for example to hold the articulation mechanism in the folded or extended configuration. In some examples a tensioning element is a compression tensioning element. In some examples a tensioning element is an extension tensioning element. In examples, a tensioning element is a spring, such as a compression spring. In embodiments, the tensioning element is coupled to the rotational actuation member. In embodiments, rotational actuation member is coupled to a hand activated trigger. Also disclosed in an umbrella rib articulation mechanism as described above:

FIGS. 1A-1D show an umbrella that can be folded so as not to obscure the view of a user, in accordance with embodiments herein. FIG. 1A is front view of the umbrella with the foldable portion folded down, in accordance with embodiments herein. FIG. 1B is a side view of the umbrella with the foldable portion folded down, in accordance with embodiments herein. FIG. 1C is a front view of the umbrella with the foldable portion folded up, in accordance with embodiments herein. FIG. 1D is a side view of the umbrella with the foldable portion folded up, in accordance with embodiments herein. As shown in FIGS. 1A-1D an adjustable non-view obscuring umbrella 100 includes a canopy 105 and a post 112. The canopy of the umbrella includes a foldable portion 110 that can be folded up and out of the way of user so as not to obscure the view of the user trying to look under the bottom portion of the canopy 105. As shown in FIGS. 1B and 1D, the post 112 can be composed of multiple portions, including a upper portion 114 and a lower portion 116 that can, in some embodiments, be articulated around a joint 118, for example to tilt the umbrella and thereby block the sunlight coming in from an angle. The adjustable non-view obscuring umbrella 100 is particularly suited to this tilting as the foldable section 110 of the canopy 105 can be folded up and out of the way of the user, for example a user that wants to block sunlight, but still wants a view of the landscape etc. under the lower edge of the canopy in the direction the sunlight is coming. In embodiments, the post 112 can be attached to any suitable item that maintains position, such as a stand and/or a table.

Figure 2B:
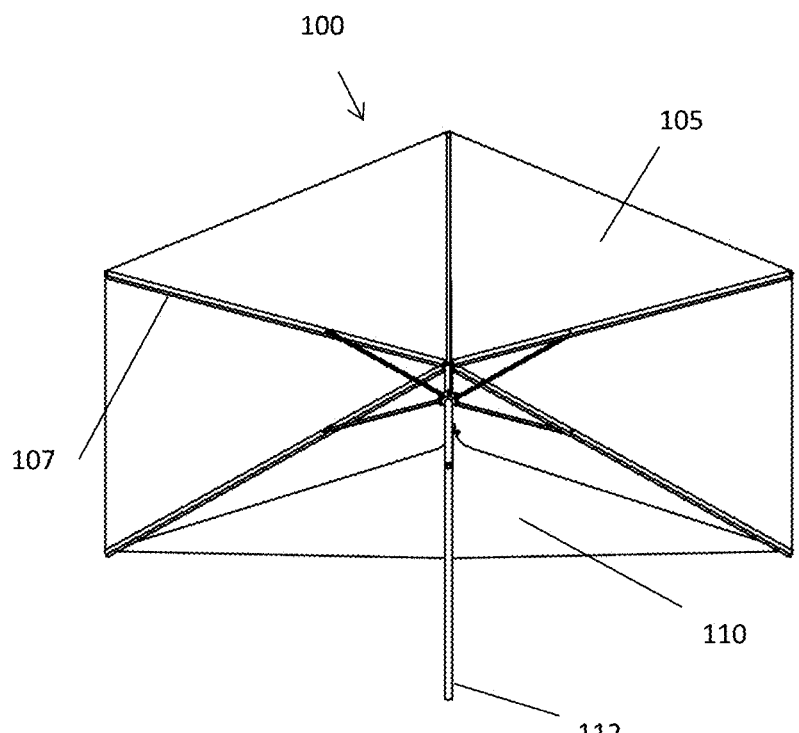
FIG. 2B are back view illustrations of an umbrella that can be folded so as not to obscure the view of a user, in accordance with embodiments herein. In the illustrations the foldable portion is shown folded up.

FIGS. 2A-2B are back view illustrations of an umbrella that can be folded so as not to obscure the view of a user, in accordance with embodiments herein. FIG. 2A is back view of the umbrella with the foldable portion folded down, in accordance with embodiments herein. FIG. 2B is a back view of the umbrella with the foldable portion folded up, in accordance with embodiments herein. As shown in FIGS. 2A-2C the adjustable non-view obscuring umbrella 100 includes the canopy 105 and the post 112. In addition, the adjustable non-view obscuring umbrella 100 include a support structure 107, for supporting the canopy, for example when the umbrella is open.

FIGS. 3A-3C are illustrations of a support structure of an umbrella that can be folded so as not to obscure the view of a user, in accordance with embodiments herein. FIG. 3A shows a side view a support structure of an umbrella with the foldable portion in the extended position, in accordance with embodiments herein. FIG. 3B shows a side view of a support structure of an umbrella with the foldable portion in the extended position, in accordance with embodiments herein. FIG. 3C shows a back view of a support structure of an umbrella that with the foldable portion in the extended position, in accordance with embodiments herein. As shown in FIGS. 3A-3C, a support structure 107 for a non-view obscuring umbrella includes a post 112 that can include an upper portion 114, a lower portion 116, and a joint 118. Atop the post 112 sit ribs 119 and 120 upon which the canopy sits, and, optionally, is attached. The ribs 119, 120 are attached to the top of the post 112 at a cap 121, and are typically allowed to articulate at this joint, for example, to fold the umbrella for stowage. The support structure 107 also includes stretchers 122 that are attached at opposite ends to the ribs 119, 120 and a runner 123. The runner 123 runs up and down the post 112 to raise and lower the ribs 119, 120 of the support structure 107. Typically, the runner 123 can be locked or held in place by pin or other mechanism (for example a hand crank) to keep the umbrella open and/or close the umbrella. As shown in FIGS. 3A-3C the support structure includes two types of ribs, ribs 119 and 120 respectfully. Rib 119 is a non-articulating rib, typical to most umbrellas, while rib 120, as detailed below, is a articulating rib that folds allowing the foldable portion of the canopy to be folded out of the way. Circled portions A, B, and C of FIGS. 3A-3C are depicted in FIGS. 4A-4C below.

Figure 4A:
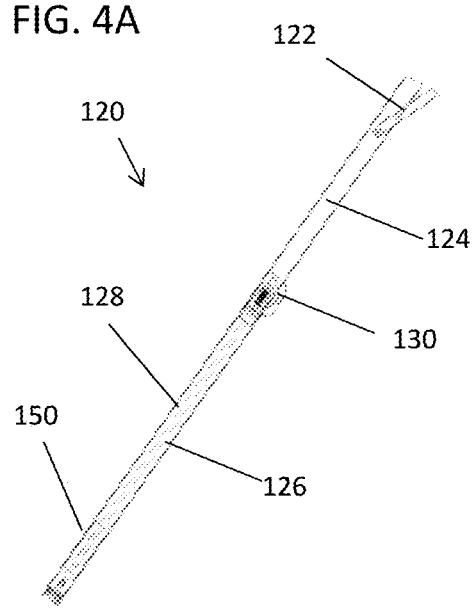
FIGS. 4A-4C are opposite side view illustrations and a front view illustration of an articulating rib of an umbrella that can be folded so as not to obscure the view of a user, with the articulating rib in the extended position, in accordance with embodiments herein.
Figure 4B:
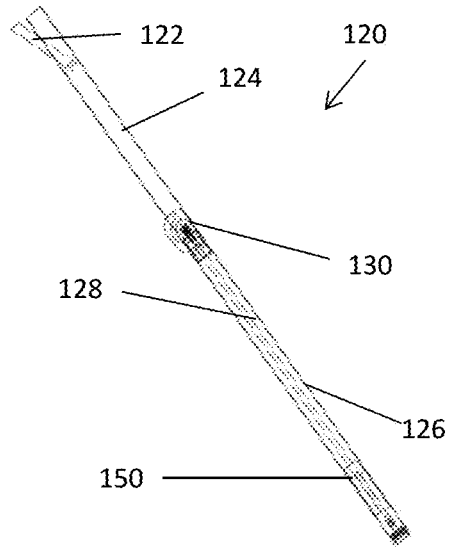
Figure 4C:
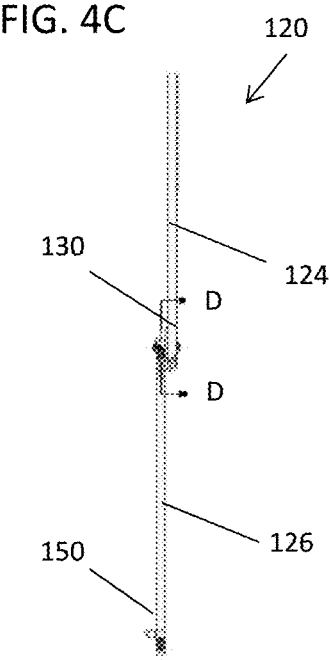

FIGS. 4A-4C are opposite side view illustrations and a front view illustration of an articulating rib of an umbrella that can be folded so as not to obscure the view of a user, in accordance with embodiments herein. FIG. 4A is a side view of an articulating rib of an umbrella in an extended position, in accordance with embodiments herein. FIG. 4B is a side view of an articulating rib of an umbrella in an extended position, in accordance with embodiments herein. FIG. 4C is a front view of an articulating rib of an umbrella in an extended position, in accordance with embodiments herein. As shown in FIGS. 4A-4C an articulating rib 120 includes a rib top portion 124, a rib bottom portion 126, and a rib folding mechanism 130, about which the rib top portion 124 and the rib bottom portion 126 can rotate. As shown, the rib bottom portion 126 includes a release rod 128 that can be used to release the folding mechanism 130, for example using release slide 150. While a particular release mechanism is shown, others are envisioned, for example cables, push buttons, spring actions, mechanical or electromechanical actuators, and the like. Also shown in these views is stretcher 122. Section D-D of FIG. 4C is shown as FIG. 5.

Figure 5:
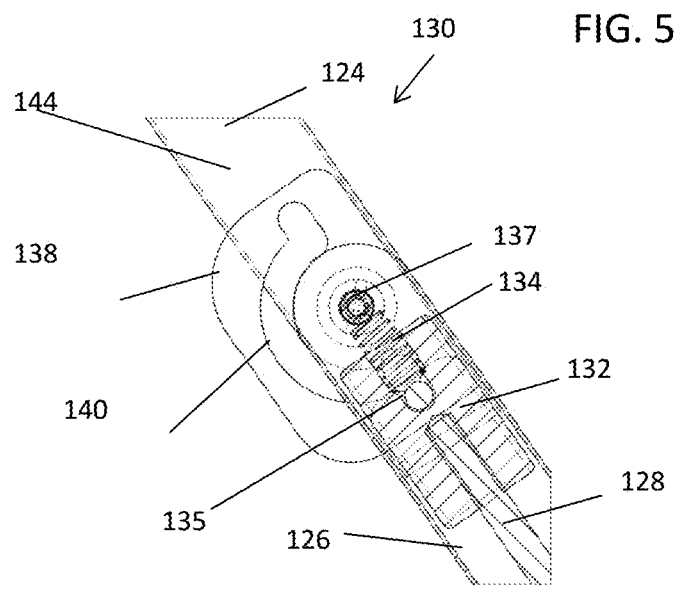
FIG. 5 is a close up view of a rib folding mechanism, in accordance with embodiments herein.

FIG. 5 is a close up view of a rib folding mechanism, in accordance with embodiments herein. As shown in FIG. 5 a rib folding mechanism 130 is coupled at one end to the rib top portion 124 and at the other end to rib bottom portion 126. The rib folding mechanism 130 includes an upper bracket 138 that is coupled to an actuator block 132 and allowed controlled rotation about fastener 137. The upper bracket 138 is coupled to rib top portion 124. The rib folding mechanism 130 also includes the actuator block 132 which is attached to a compression tensioner 134, such as a spring. The actuator block 132 includes a locator pin 135 that rides in a channel 140 of upper bracket 138 and which can slide in to an extended position stop (not shown in this view) and a folded position stop 144 contiguous with the channel 140. As can be seen in this view, when release rod 128 is moved toward the rib top portion 124 the locator pin 135 moves out of the extended position stop (not shown in this view) and can move in the channel 140 thereby folding the foldable portion of the canopy.

FIGS. 6A-3C are illustrations of a support structure of an umbrella that can be folded so as not to obscure the view of a user, in accordance with embodiments herein. FIG. 6A shows a side view a support structure of an umbrella with the foldable portion folded up, in accordance with embodiments herein. FIG. 6B shows a side view of a support structure of an umbrella with the foldable portion folded up, in accordance with embodiments herein. FIG. 6C shows a back view of a support structure of an umbrella with the foldable portion folded up, in accordance with embodiments herein. As shown in FIGS. 6A-6C, a support structure 107 for a non-view obscuring umbrella includes a post 112 that can include an upper portion 114, a lower portion 116, and a joint 118. Atop the post 112 sit ribs 119 and 120 upon which the canopy sits, and, optionally, is attached. The ribs 119, 120 are attached to the top of the post 112 at a cap 121, and are typically allowed to articulate at this joint, for example, to fold the umbrella. The support structure 107 also include stretchers 122 that are attached at opposite ends to the ribs 119, 120 and a runner 123. As shown in FIGS. 6A-6C the support structure includes two types of ribs, ribs 119 and 120 respectfully. Rib 119 is a non-articulating rib, typical to most umbrellas, while rib 120, as detailed below, is a articulating rib that folds allowing the foldable portion of the canopy to be folded out of the way. Circled portions A, B, and C of FIGS. 6A-3C are depicted in FIGS. 7A-7C and 8A-8C below.

Figure 7A:
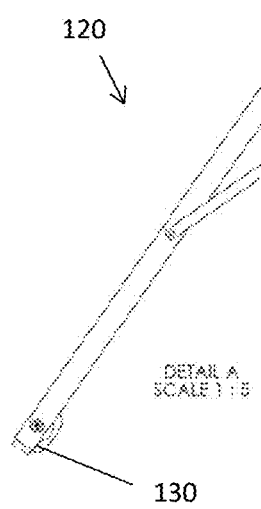
FIGS. 7A-7C are side view illustrations and a front view illustration of an articulating rib of an umbrella that can be folded so as not to obscure the view of a user, with the foldable portion folded up, in accordance with embodiments herein.
Figure 7B:
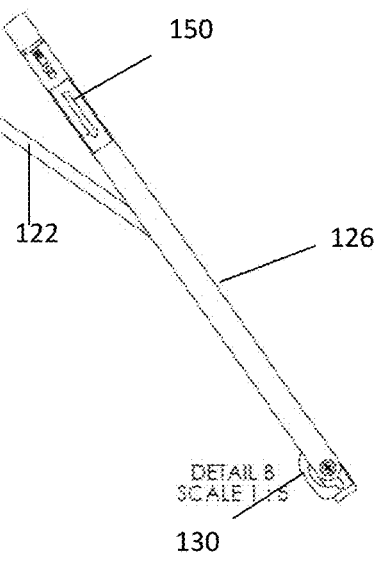
Figure 7C:
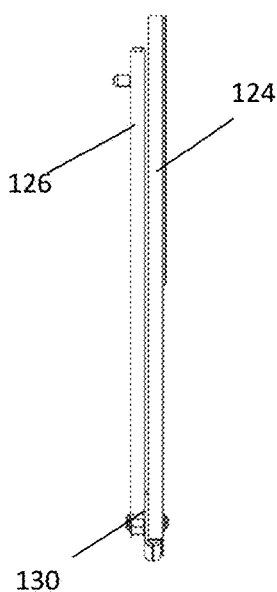

FIGS. 7A-7C are opposite side view illustrations and a front view illustration of an articulating rib of an umbrella with the foldable portion folded up, in accordance with embodiments herein. FIG. 7A is a side view of an articulating rib of an umbrella with the foldable portion folded up, in accordance with embodiments herein. FIG. 7B is a side view of an articulating rib of an umbrella showing the overlapping rib portions with the foldable portion folded up, in accordance with embodiments herein. FIG. 7C is a front view of an articulating rib of an umbrella with the foldable portion folded up, in accordance with embodiments herein. As shown in FIGS. 7A-7C an articulating rib 120 includes a rib top portion 124, a rib bottom portion 126, and a rib folding mechanism 130 about which the rib top portion 124 and the rib bottom portion 126 can fold. As shown, the rib bottom portion 126 includes a release rod 128 that can be used to release the folding mechanism 130, for example using release slide 150.

Figure 8A:
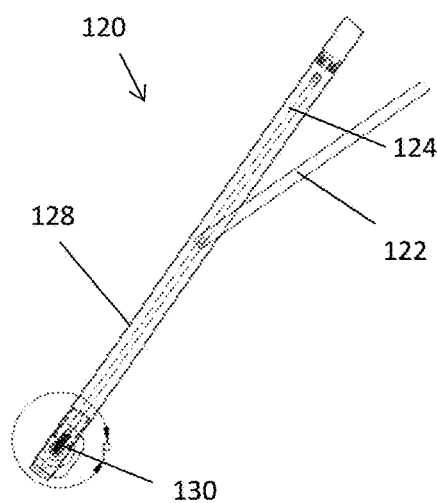
FIGS. 8A-8C are opposite side view illustrations and a front view illustration of an articulating rib of an umbrella that can be folded so as not to obscure the view of a user, with the foldable portion folded up and showing the internal structure, in accordance with embodiments herein.
Figure 8B:
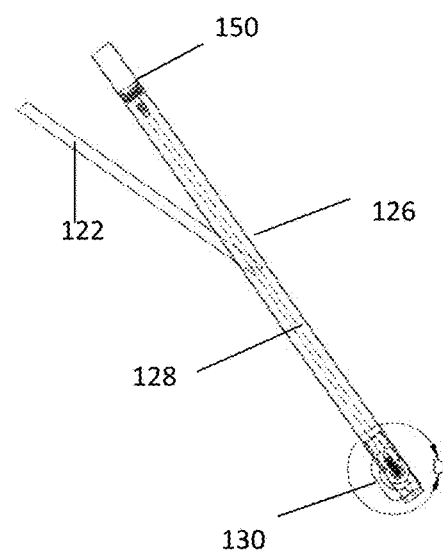
Figure 8C:
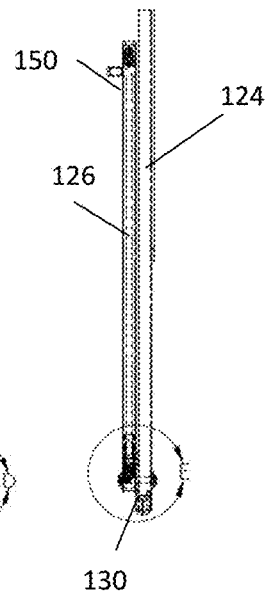

FIGS. 8A-8C are opposite side view illustrations and a front view illustration of an articulating rib of an umbrella that can be folded so as not to obscure the view of a user, in accordance with embodiments herein. The outer ribs are shown as transparent. FIG. 8A is a side view of an articulating rib of an umbrella that can be folded so as not to obscure the view of a user, in accordance with embodiments herein. FIG. 8B is a side view of an articulating rib of an umbrella that can be folded so as not to obscure the view of a user, in accordance with embodiments herein. FIG. 8C is a front view of an articulating rib of an umbrella that can be folded so as not to obscure the view of a user, in accordance with embodiments herein. As shown in FIGS. 8A-8C an articulating rib 120 includes a rib top portion 124, a rib bottom portion 126, and a rib folding mechanism 130 about which the rib top portion 124 and the rib bottom portion 126 can fold. As shown, the rib bottom portion 126 includes a release rod 128 that can be used to release the folding mechanism 130, for example using release slide 150. While a particular release mechanism is shown, others are envisioned, for example cables, push buttons, spring actions, mechanical or electromechanical actuators, and the like. Also shown in these views is stretcher 122.

Figure 9A:
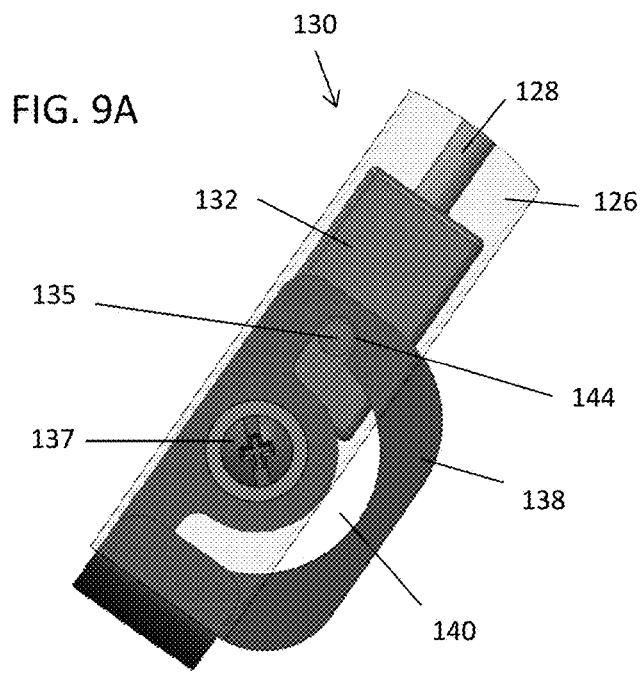
FIGS. 9A-9C are close up views of a rib folding mechanism, in accordance with embodiments herein.
Figure 9B:
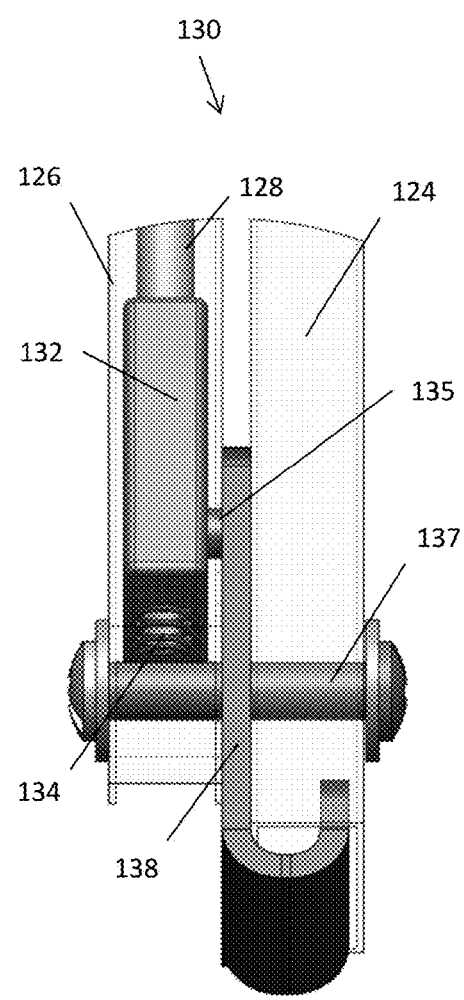
Figure 9C:
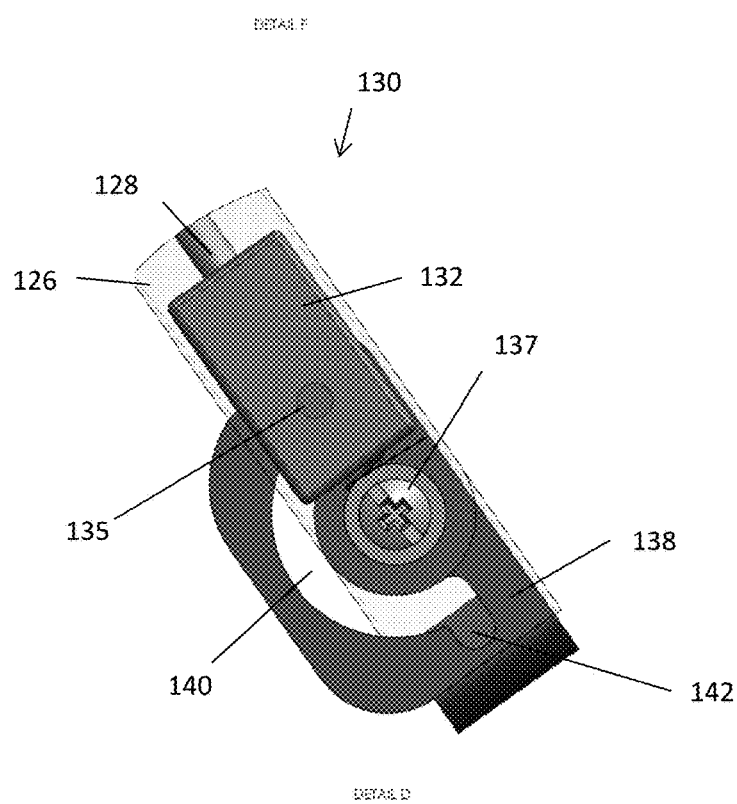

FIGS. 9A-9C are close up views of a rib folding mechanism in the folded position, in accordance with embodiments herein. FIG. 9A is a side view of a rib folding mechanism, in accordance with embodiments herein. FIG. 9B is a side view of a rib folding mechanism, in accordance with embodiments herein. FIG. 9C is a front view of a rib folding mechanism, in accordance with embodiments herein. As shown in FIGS. 9A-9C a rib folding mechanism 130 is coupled at one end to the rib top portion 124 and at the other end to rib bottom portion 126. The rib folding mechanism 130 includes an upper bracket 138 that is couple to an actuator block 132 and allowed controlled rotation about fastener 137. The upper bracket 138 is coupled to rib top portion 124. The rib folding mechanism 130 also includes the actuator block 132 which is attached to a compression tensioner 134, such as a spring. The actuator block 132 includes a locator pin 135 that rides in a channel 140 of upper bracket 138 and which slides in to an extended position stop 142 and a folded position stop 144 of the channel 140. As can be seen in this view when release rod 128 is moved away from the rib bottom portion 124 the locator pin 135 moves out of the extended position stop 142 and can move in the channel 140 thereby unfolding the foldable portion of the canopy.

FIGS. 10A-10C are opposite side view illustrations and a front view illustration of an articulating rib showing the folding of the rib, in accordance with embodiments herein. The numbering is as described above The circled portions G, H, and J in FIGS. 10A-10C are shown in FIGS. 11A-11C.

Figure 11A:
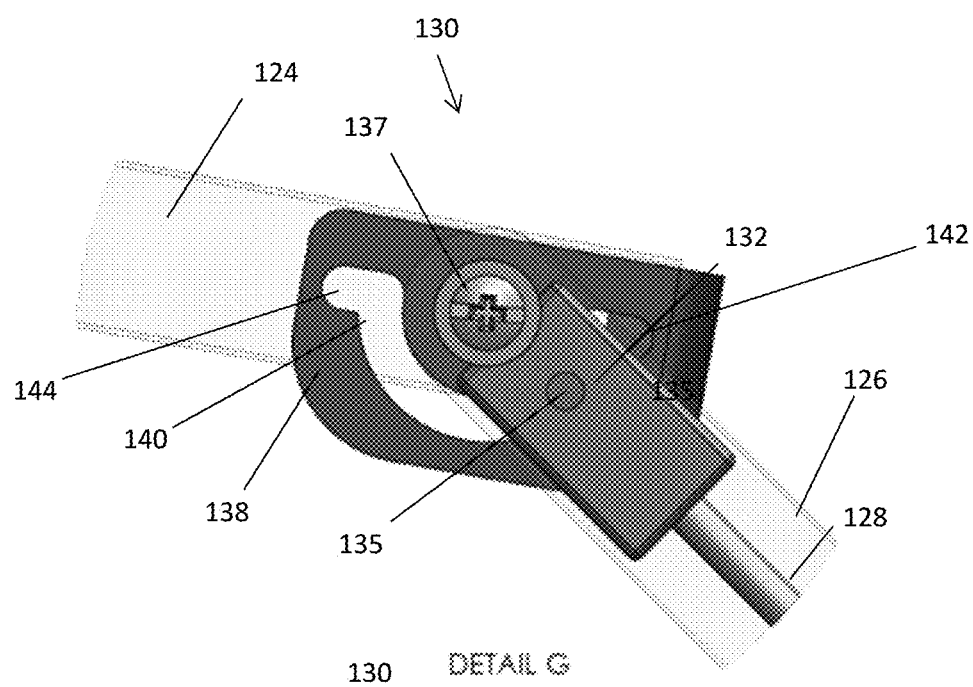
FIGS. 11A-11D are close up views of a rib folding mechanism, in accordance with embodiments herein.
Figure 11B:
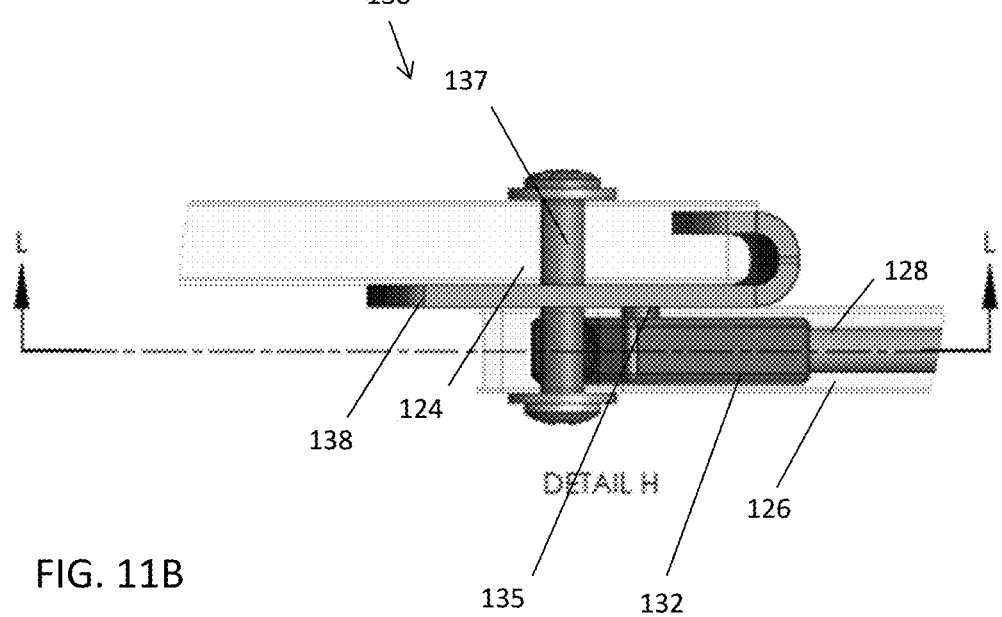
Figure 11C:
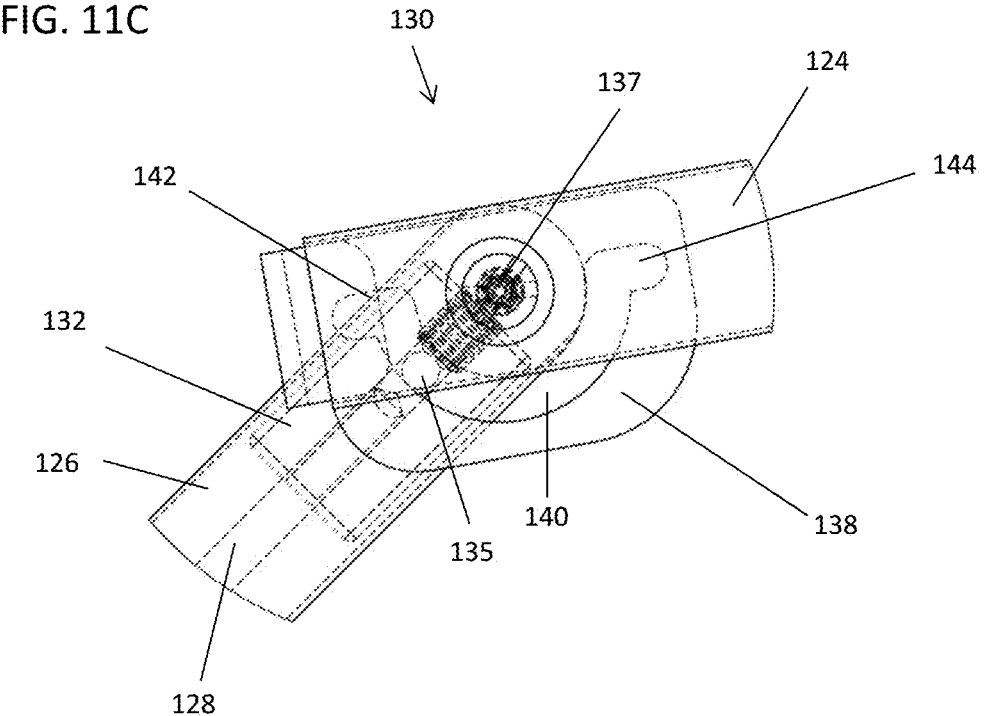
Figure 11D:
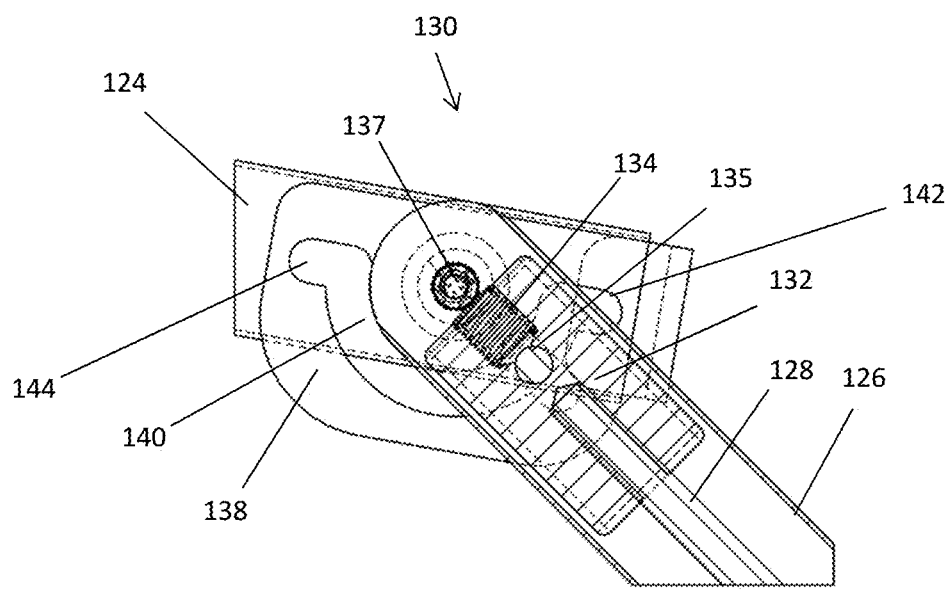

FIGS. 11A-11D are close up views of a rib folding mechanism, in accordance with embodiments herein. The numbering is as described above. The section L-L of FIG. 11 B is shown in FIGS. 11D G, H, and J are shown in FIGS. 11A-11C.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

The invention claimed is:

1. An adjustable non-view obscuring umbrella, comprising:
   a canopy; and
   a support structure, the support structure comprising:
      a support post;

a plurality of non-articulating umbrella ribs; and
at least one articulating umbrella rib;
wherein the articulating rib comprising an upper rib member, a lower rib member, and an umbrella rib articulation mechanism,
the rib articulation mechanism comprising:
an upper bracket, coupled to the upper rib member and comprising a semi-circular channel; and
a rotation actuation member, wherein the rotation actuation member is rotationally coupled to the upper bracket, the rotation actual member comprising a locator pin, wherein the locator pin rides within the semi-circular channel of the upper bracket;
wherein the upper bracket comprises a folded position stop and an extended position stop;
wherein the folded position stop and the extended position stop comprise channels in communication with the semicircular channel.

2. The adjustable non-view obscuring umbrella of claim 1, wherein the umbrella rib articulation mechanism further comprises a tensioning element.

3. The adjustable non-view obscuring umbrella of claim 2, wherein the tensioning element comprises a compression spring.

4. The adjustable non-view obscuring umbrella of claim 2, wherein the tensioning element is coupled to the rotational actuation member.

5. The adjustable non-view obscuring umbrella of claim 1, wherein the rotational actuation member is coupled to a hand activated trigger.

6. An articulating umbrella rib, comprising:
an upper rib member;
a lower rib member; and
an umbrella rib articulation mechanism, the rib articulation mechanism, comprising:
an upper bracket coupled to the upper rib member, the upper bracket comprising:
a semi-circular channel; and
a rotation actuation member, wherein the rotation actuation member is rotationally coupled to the upper bracket, the rotation actuation comprising:
a locator pin, wherein the locator pin rides within the semi-circular channel of the upper bracket, wherein the rib articulation mechanism further comprises a tensioning element.

7. The articulating umbrella rib of claim 6, wherein the upper bracket comprises a folded position stop and an extended position stop.

8. The articulating umbrella rib of claim 7, wherein the folded position stop and the extended position stop comprise channels in communication with the semicircular channel.

9. The articulating umbrella rib of claim 6, wherein the tensioning element comprises a compression spring.

10. The articulating umbrella rib of claim 6, wherein the tensioning element is coupled to the rotational actuation member.

11. The articulating umbrella rib of claim 6, wherein the rotational actuation member is coupled to a hand activated trigger.

12. An umbrella rib articulation mechanism, comprising:
an upper bracket, comprising a semi-circular channel; and
a rotation actuation member, wherein the rotation actuation member is rotationally coupled to the upper bracket, the rotation actuation member comprising: a locator pin, wherein the locator pin rides within the semi-circular channel of the upper bracket, wherein the umbrella rib further comprises a tensioning element, wherein the tensioning element comprises a compression spring.

13. The umbrella rib articulation mechanism of claim 12, wherein the upper bracket comprises a folded position stop and an extended position stop.

14. The umbrella rib articulation mechanism of claim 13, wherein the folded position stop and the extended position stop comprise channels in communication with the semicircular channel.

15. The umbrella rib articulation mechanism of claim 12, wherein the tensioning element is coupled to the rotational actuation member.

* * * * *